(12) United States Patent
Poupinet

(10) Patent No.: US 8,018,080 B2
(45) Date of Patent: Sep. 13, 2011

(54) HYDROELECTRIC DEVICE FOR THE PRODUCTION OF ELECTRICITY, PARTICULARLY FROM TIDAL CURRENTS

(76) Inventor: Georges Poupinet, Vernon (FR)

( * ) Notice: Subject to any disclaimer, the term of this patent is extended or adjusted under 35 U.S.C. 154(b) by 246 days.

(21) Appl. No.: 12/444,786

(22) PCT Filed: Oct. 12, 2006

(86) PCT No.: PCT/FR2006/002318
§ 371 (c)(1),
(2), (4) Date: Apr. 8, 2009

(87) PCT Pub. No.: WO2008/043886
PCT Pub. Date: Apr. 17, 2008

(65) Prior Publication Data
US 2009/0315331 A1    Dec. 24, 2009

(51) Int. Cl.
*F03B 13/12* (2006.01)
(52) U.S. Cl. ............................................ 290/43; 290/54
(58) Field of Classification Search .................. 290/53, 290/54, 42, 43; 415/7; 416/84
See application file for complete search history.

(56) References Cited

U.S. PATENT DOCUMENTS

| | | | |
|---|---|---|---|
| 4,301,377 A | | 11/1981 | Rydz |
| 4,843,249 A | * | 6/1989 | Bussiere .................... 290/53 |
| 6,246,125 B1 | * | 6/2001 | Axtell .......................... 290/1 A |
| 6,534,881 B1 | * | 3/2003 | Slavchev ........................ 290/54 |
| 6,652,221 B1 | * | 11/2003 | Praenkel ........................ 415/3.1 |
| 7,075,189 B2 | * | 7/2006 | Heronemus et al. ............ 290/44 |
| 7,307,356 B2 | * | 12/2007 | Fraenkel ......................... 290/54 |
| 7,474,013 B2 | * | 1/2009 | Greenspan et al. ............. 290/53 |
| 2004/0026930 A1 | * | 2/2004 | Baggett .......................... 290/54 |
| 2009/0115193 A1 | * | 5/2009 | Branco ........................... 290/54 |

FOREIGN PATENT DOCUMENTS

| | | |
|---|---|---|
| FR | 2278941 | 7/1974 |
| NL | 8500252 A | 8/1986 |
| WO | 0106120 A1 | 1/2001 |
| WO | 2006060761 A1 | 6/2006 |

* cited by examiner

*Primary Examiner* — Tho Dac Ta
(74) *Attorney, Agent, or Firm* — The Webb Law Firm

(57) ABSTRACT

A hydroelectric device, for the production of electricity in an aquatic environment with currents, includes a frame supporting a rotating member having a number of bearing surfaces that cooperate with the currents to generate a rotation of the rotating member. An electromechanical device produces an electrical current from the rotation. The hydroelectric device also includes a device for adjusting the position of the rotating member with reference to the surface of the aquatic environment. The latter device includes a tank having a variable opening positionable under the surface of the aquatic environment for modifying the water filling rate of the tank. The rotating member may be mounted on the frame by means of a shaft extending along a perpendicular direction to the currents, which facilitates the coupling thereof to one or two similar hydroelectric device shafts arranged at either end of the first, in alignment.

19 Claims, 4 Drawing Sheets

HYDROELECTRIC DEVICE FOR THE PRODUCTION OF ELECTRICITY, PARTICULARLY FROM TIDAL CURRENTS

FIELD OF THE INVENTION

The present invention relates to a hydroelectric device; for the production of electricity in an aquatic environment of the type with currents.

DESCRIPTION OF RELATED ART

Devices for harnessing of energy from tidal currents are known in the art. Some of these devices implement propeller or blade type underwater current generators, the latter being derived directly from the wind generators used with wind.

However, the devices known according to the prior art generally require the implementation of complex designs to enable them to withstand the difficult conditions of the environment in which they are intended to operate. In spite of all the precautions taken, these mechanisms always remain sensitive to their external environment, particularly when they are installed in the sea, in contact with salt water. In this way, these designs do not make it possible to modify the installation depth of these devices easily according to the characteristics of the tides, for example. The operating depth is pre-defined and adjusted at the time of installation of the device.

In addition, it may be noted that, according to the prior art, the blade harnessing surface being limited by the dimensions thereof, the current speed must reach approximately 5 knots for the electricity generator to actually start producing. This reduces the number of usable sites considerably.

SUMMARY OF THE INVENTION

The present invention overcomes the drawbacks of the hydroelectric devices according to the prior art by proposing a device capable of being adapted to the changes in the properties of currents with which it cooperates to optimise the efficiency thereof and enable installation even in zones with relatively weak currents.

To this end, the present invention relates more specifically to a hydroelectric device including an adjustment device for adjusting the position of the rotating member with reference to the surface of the aquatic environment, to optimize the rotation thereof. The adjustment device includes a tank having a variable opening intended to be positioned under the surface of the aquatic environment to make it possible to modify the water filling rate of the tank.

Thanks to these features, the adjustment device advantageously uses the properties of its environment to fulfil its role efficiently and reliably, in that the majority of the constituents thereof are adapted to the environment wherein they are intended to operate.

Desirably, the adjustment device includes a pumping device supplied with electricity by the electromechanical device, via an electrical connection, to make it possible to pump water from the tank. In addition, this electromechanical device may advantageously be arranged on an upper portion of the frame intended to be located continuously at a higher level than that of the surface of the aquatic environment.

Desirably, the rotating member includes a rotation shaft connected to the frame by means of at least one bearing. The hydroelectric device can also include a mechanical connection means to connect said shaft to at least one shaft of a rotating member of another identical hydroelectric device intended to be arranged in the vicinity of the first.

Thanks to these features, a large number of hydroelectric devices may be connected, preferably via the rotation shafts thereof, to form an assembly capable of producing an electric current in weak currents wherein the hydroelectric devices according to the prior art are ineffective.

Moreover, the specific features of the hydroelectric device according to the present invention make it possible to perform the assembly thereof on land before towing it with the empty tank to the installation site, for example in the sea.

BRIEF DESCRIPTION OF THE DRAWINGS

Other features and advantages of the present invention will emerge more clearly on reading the detailed description of a preferred embodiment hereinafter, with reference to the appended figures given as non-limitative examples, wherein.

DETAILED DESCRIPTION OF THE INVENTION

Figure 1:
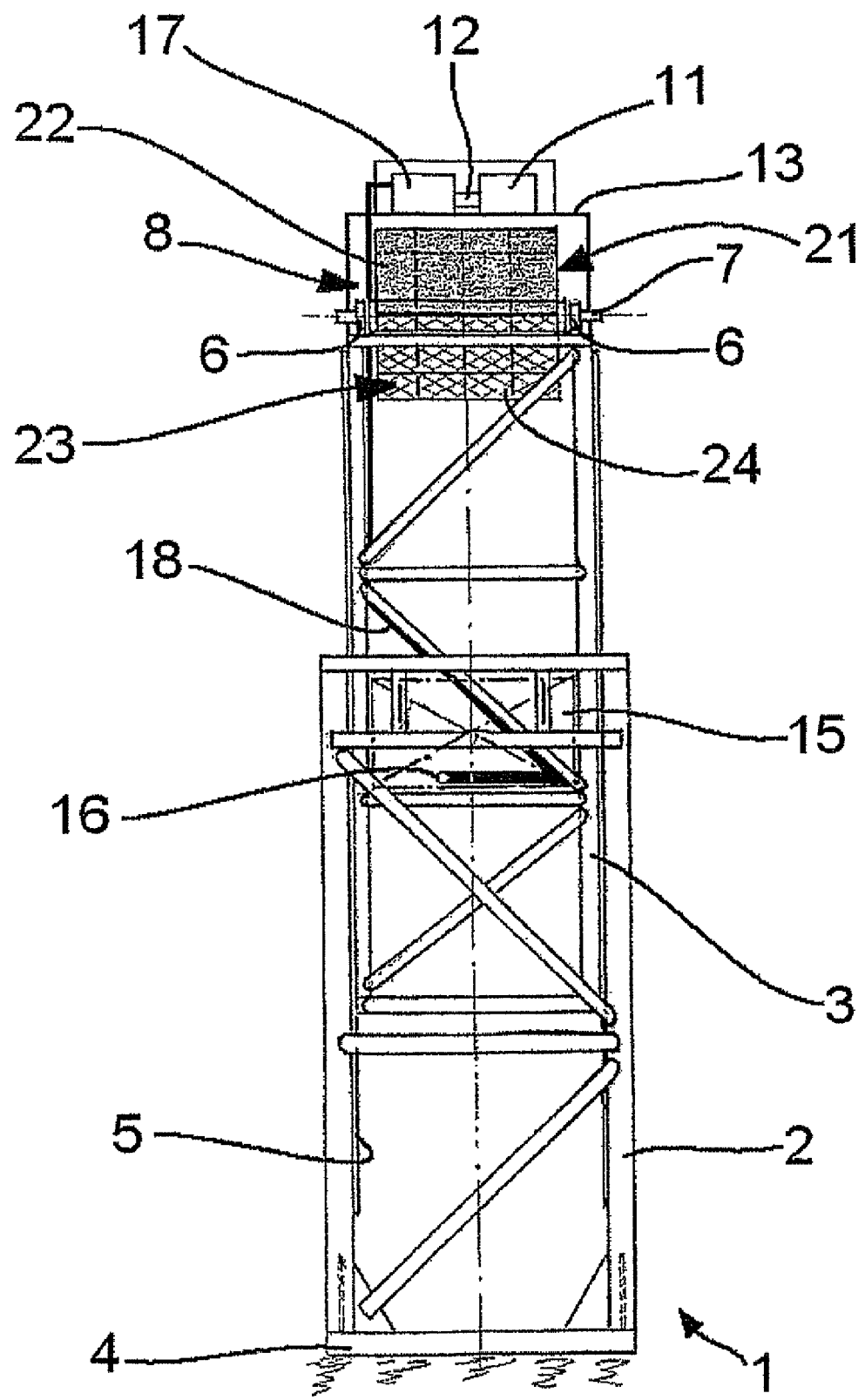
FIG. 1 represents a simplified front view of a hydroelectric device according to a preferred embodiment of the invention.

The hydroelectric device according to a preferred embodiment of the invention is shown in a simplified front view in FIG. 1, as an illustration. The device comprises a basic structure defining a frame 1 having a lower portion 2 and an upper portion 3 liable to be moved with respect to the other to have an adjustable relative position.

The lower portion 2—made of welded steel tubes in the figures but which can be manufactured with other materials—has a square-shaped base 4 which could also be rectangular. It is intended to be high, fixed and/or ballasted on the sea bed. It may alternatively be envisaged for the device to simply be floating without going beyond the scope of the present invention.

The upper portion 3, mounted in translation on vertical guide rails 5 attached to the lower portion 2, has a similar shape to same, with slightly lower transverse dimensions. It is possible to provide a stop on the lower portion to limit the penetration height of the upper portion in the lower portion. Similarly, stops may be provided to retain the upper portion in the lower portion in the case of wide-amplitude translations.

The upper portion 3 supports bearings 6 wherein the shaft 7 of a rotating member 8, represented in the figures in the form of a bladed wheel, as a non-limiting example, is mounted.

Figure 2:
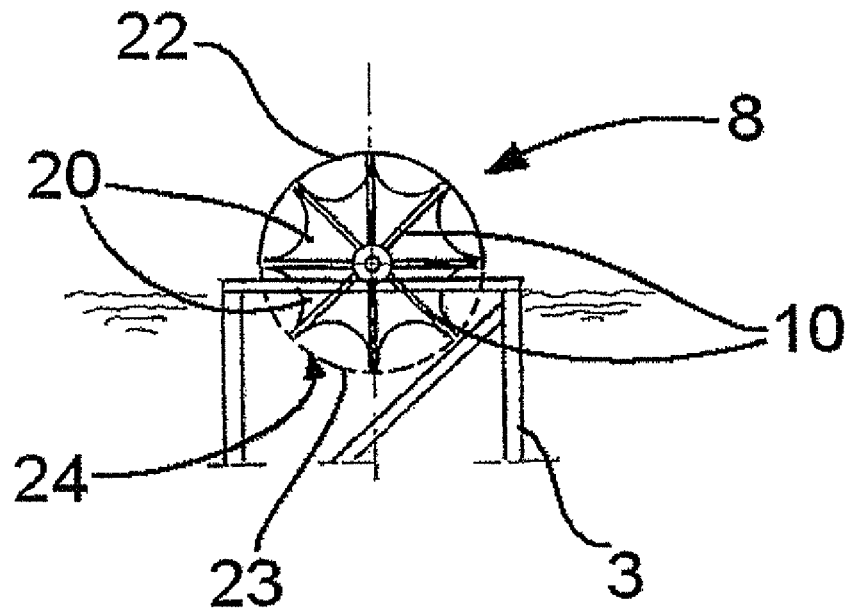
FIG. 2 represents a simplified side view of a design detail of the device in FIG. 1.

As will emerge more clearly from the description with reference to FIG. 2, the bladed wheel 8 comprises bearing surfaces 10, intended to cooperate with the currents in the aquatic environment wherein the device is to be installed, in order to rotate same.

An electromechanical electricity generation device 11 is arranged in the vicinity of the shaft 7 to generate a current in response to the rotation movements thereof. The electromechanical device may be of any known type adapted to the implementation of the present invention, and will particularly comprise an A.C. generator preferably driven via a multiplier mechanism (not shown).

The electromechanical device 11 is preferably connected electrically to one of the management and distribution circuits 12 of the electricity produced by movements of the rotating member.

The upper portion 3 of the frame bears a support 13, at a higher level than that of the rotating member 8 and, whereon the management and distribution circuits 12 are mounted, to keep same continuously out of the aquatic environment. Thanks to such a positioning, a superior service life is guaranteed for these circuits than if they were at least partially immersed.

The upper portion also bears a solid watertight caisson intended to fulfil the role of tank 15, arranged at a predefined height below the rotating member, that those skilled in the art may select without great difficulty according to their specific requirements.

The tank is provided with an opening 16 wherein the access is preferably controlled by a valve. An electropump 17 is also fixed on the upper portion, preferably outside the water such as for example on the support 13, by being connected to the tank 15, by a conduit identified schematically using the reference 18, in order to extract water when it is activated.

Advantageously, the valve may be of the electropneumatic type, with an analogue or numerical control, and be supplied with electricity by the management and distribution circuits 12, as for the electropump 17. In addition, it may be envisaged for the management and distribution circuits to comprise a controller circuit, programmed to automate the operation of the valve and the electropump, either as a function of measurements made by a sensor, or in a predefined manner.

Alternatively or additionally, it is possible to envisage that the hydroelectric device comprises a wireless transmission device to control the operation of the valve and the electropump remotely. The management and distribution circuits are connected to land by an electric line (not shown) to enable subsequent processing of the electricity generated by the hydroelectric device. In this way, it is possible to provide a second electric line, installed with the first, to supply the valve and/or the electropump from land, as an alternative to that described above. It is also possible to envisage charging a battery (not shown) installed on the device, when the currents permit, whereas said battery supplies the valve and the electropump with the electricity when required.

FIG. 2 represents, in a simplified manner, a detail of the hydroelectric device in FIG. 1, more specifically in the top part of the upper portion 3 thereof, where the mobile part of the device enabling the generation of electricity from marine or river currents is located.

As mentioned above, the mobile part of the device is a rotating member 8, represented herein in the form of a bladed wheel as an illustration.

The wheel comprises a plurality of bearing surfaces 10 extending along radial directions about the shaft 7 and possibly being plane, as shown, or curved in the case of river currents. The bearing surfaces are in this case reinforced by ribbing 20 connecting same in pairs. The plane bearing surfaces are more specifically adapted to an implementation of the device in conjunction with tidal currents to make use of the turn phenomenon thereof.

Advantageously, it may be envisaged that the rotating member 8 is enclosed in a cover 21 of a suitable shape, cylindrical in the embodiment shown in the figures. The cover 21 has two half-cylinders, one upper 22 and the other lower 23. The upper half-cylinder 22 is preferably solid to prevent the currents from acting on the part of the rotating member located in the region at a given time, which could have an adverse effect on the output of the device. The lower half-cylinder 23 has openings 24 forming water passages. It may particularly be made using a grating used to limit the size of the objects or animals liable to come into contact with the rotating member.

Naturally, the cover 21 is preferably mounted on the upper portion 3 of the frame in a removable manner to enable maintenance operations.

It emerges from the above description that the hydroelectric device according to the present invention is intended to be installed, in the ocean or in a river type waterway, by being attached to the bottom of the aquatic environment in question by the lower portion 2 of the frame thereof. The structure of the frame and the fixing mode described render said device particularly suitable for shallow regions.

The position of the upper portion 3 may be adjusted to the most suitable depth to optimise the harnessing of the aquatic current by the rotating member 8, at each time, for example by accounting for the tidal coefficient in the case of an ocean installation.

Typically, the most effective position for the rotating device corresponds to the upper half located slightly above the surface of the aquatic environment, whereas at least one portion of the lower half is immersed.

For this purpose, the valve and the electropump 17 may be actuated simultaneously or in alternation, according to the desired effect, to act on the filling rate of the tank 15.

A decrease in the tank filling rate will induce a movement of the upper portion 3 of the frame in the direction of the surface, by sliding along the guide rails 5 of the lower portion. Conversely, an increase in the tank filling rate will induce a movement of the upper portion 3 of the frame in the direction of the bottom.

The controls of the valve and the electropump may be actuated as required, preferably remotely using the wireless transmission device, or in a programmed manner if the change of the currents is well known. As mentioned, a sensor, of pressure, for example, may be provided to detect the optimal positioning depth of the bladed wheel at each time. This sensor transmits the results of its measurements to the management and distribution circuits or to dedicated electronic circuits to generate a suitable response of the device and modify the tank filling rate if required.

Figure 3:
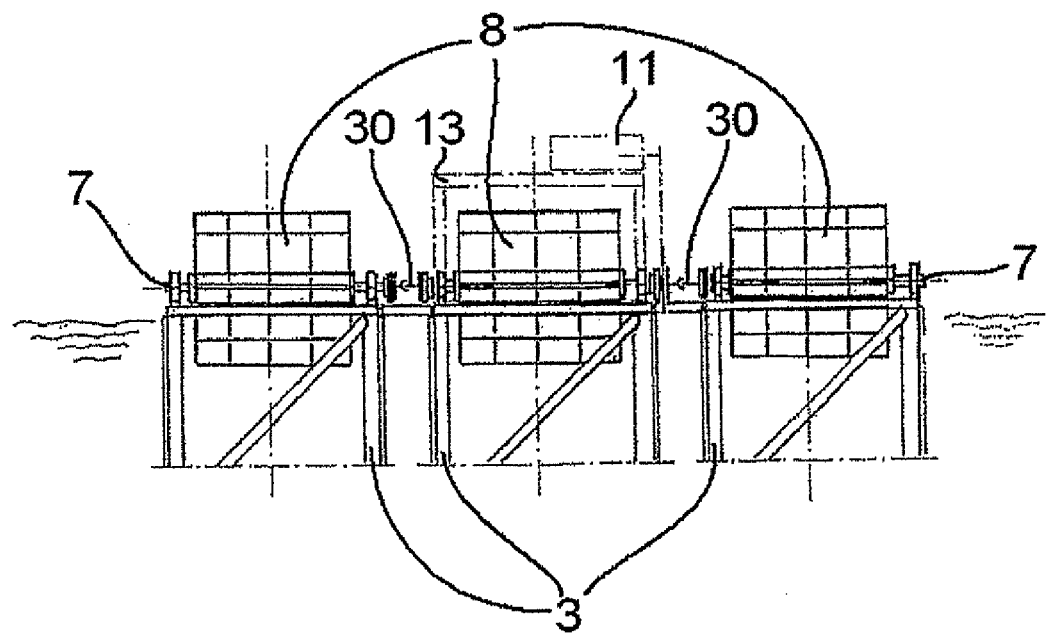
FIG. 3 represents a simplified partial front view of an assembly of hydroelectric devices similar to that in FIG. 1.

FIG. 3 represents a simplified partial front view of an assembly of hydroelectric devices, similar to that in FIG. 1, connected mechanically in pairs, according to a preferred embodiment of the present invention.

Advantageously, the lower portions 2 of the devices are connected rigidly in pairs, while being fixed to the bottom, whereas the upper portions 3 thereof may be attached to each other, at least in groups of a few units.

It is possible to envisage that the rotation shafts of the different devices are also connected in pairs, while all being connected to a single electromechanical electrical current generation device 11.

It is possible to use universal joints 30 to provide the mechanical connection of the rotation shafts thereof, or differentials to enable different relative rotation speeds and account for local current fluctuations. It is also possible to envisage connecting the upper portions in pairs with a certain play between the respective depths thereof, particularly by connecting them using resilient means, particularly springs.

Alternatively, it is also possible to mount the upper portions of the different devices such that they can move with respect to the others.

In this case also, the rotation shafts may be connected in pairs to the universal joint type mechanical connections.

The specific orientation of the rotation shaft or the rotating member, i.e. perpendicular with respect to direction of the currents, enables easy coupling for a large number of hydroelectric devices according to the present invention and, for this reason, the installation thereof in regions with relatively weak currents where other devices according to the prior art cannot be used.

In this way, it can be envisaged to provide alignments of such devices coupled with each other, or provide several close rows of such alignments. In this case, it may be advantageous to arrange adjacent alignments in a staggered fashion, i.e. a zone of an alignment located between two devices should be arranged substantially opposite a device of each of the adjacent alignments, according to the direction of the currents.

Moreover, those skilled in the art may provide arrangements adapted to their specific requirements with respect to the management and distribution circuits, valve and electropump controls, etc. Naturally, when the upper portions are coupled rigidly, it is not necessary to provide as many management and distribution circuits as there are devices in alignment. Conversely, independent controls may be provided when the upper portions are capable of moving with respect to each other.

It may also be envisaged, in regions with deep currents, to arrange several devices in alignment with vertically arranged bladed wheels.

Figure 4:
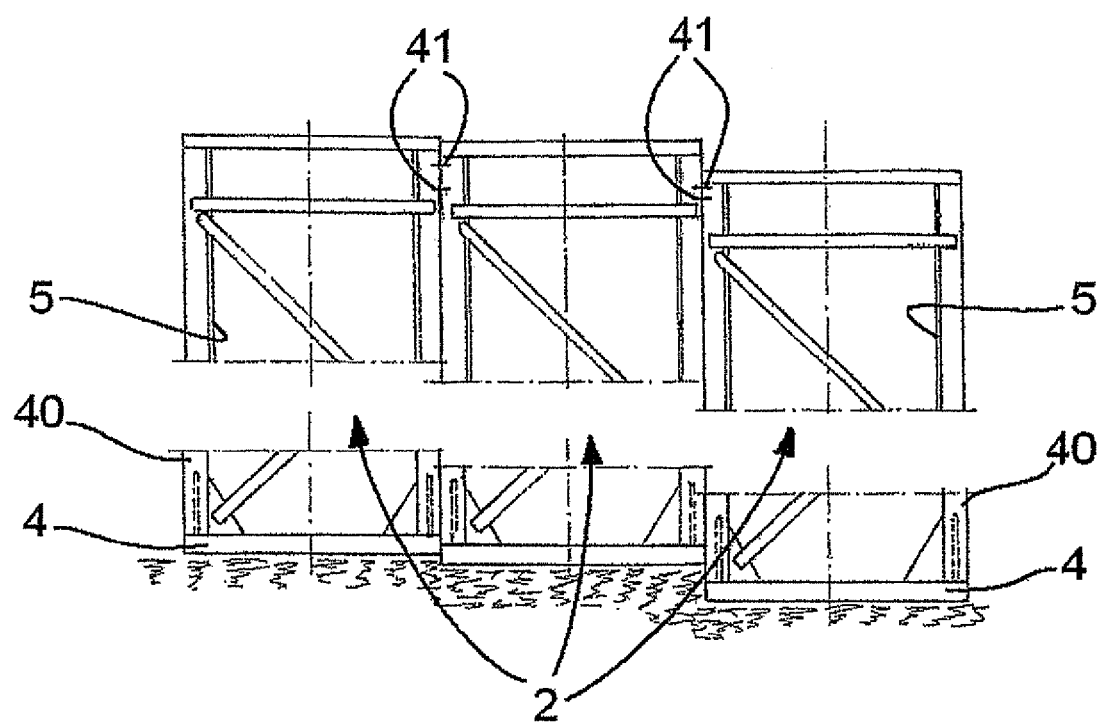
FIG. 4 represents a simplified front view of a design detail of the assembly in FIG. 3.

FIG. 4 illustrates, in a simplified front view, a specific layout of the assembly of hydroelectric devices according to FIG. 3, particularly when the bottom is not plane.

The fixing of the lower portion 2 of each frame is preferentially performed on a perfectly horizontal surface, so that the structure is vertical, so that the mechanisms thereof functions perfectly.

However, the sea bed being rarely plane, it will be possible for example to proceed in either of the following manners:
  use the dolphin technique as a basis by inserting, until a firm subsoil is encountered, four tubes intended to receive, on the horizontal plane, by means of interlocking, a connection element 40, subsequently receiving the four tubes located at the corners of the lower portion 2; or,
  if the sea bed is not excessively inclined, produce a platform made of thick reinforced cement, by fixing solidly inside, horizontally, a connection element and half-element whereon the four corner tubes of the lower portion 2 are interlocked. This cement slab forms a ballast added if required to that of the tanks 15 filled with water. Additional tanks (not shown) may be provided, attached to the lower portions 2 of the frame 1, to perform the ballast function, once filled with water.

An intermediate anchoring beam may also be used as a connection element to form the base 4 of the frame, being connected to the buried structure and arranged to receive the constituent elements of the lower portion 2.

The structure of the frame 1 may be made of metal or plastic materials, without going beyond the scope of the present invention, according to requirements.

As a general rule, it is possible to envisage connecting the lower portions of adjacent devices in pairs by means of bolts 41, as a non-limitative indication.

In regions with a high storm risk, additional specific measures may be envisaged to reinforce the assembly of devices described above.

It is particularly possible to envisage large dimensions for the different structures and structure assemblies, the total weight thereof and the attachment thereof representing an important factor in the stability thereof. It will also be possible to ballast same as much as possible in the same aim.

Moreover, it can also be envisaged to surround the assembly of hydroelectric devices forming a production unit by a band of other structures (not shown) devoid of engines but having, at the top thereof, on a height to be determined, breakwater elements such as vertical and/or horizontal tubes or profiles positioned so as to "break" the storm sheets. This specific structure may also comprise an inspection track to monitor and facilitate the maintenance of the assembly.

In addition, it is possible to envisage surrounding the above assembly, including the breakwater structure by perfectly tightened cables specially adapted to the aquatic environment.

Figure 5:
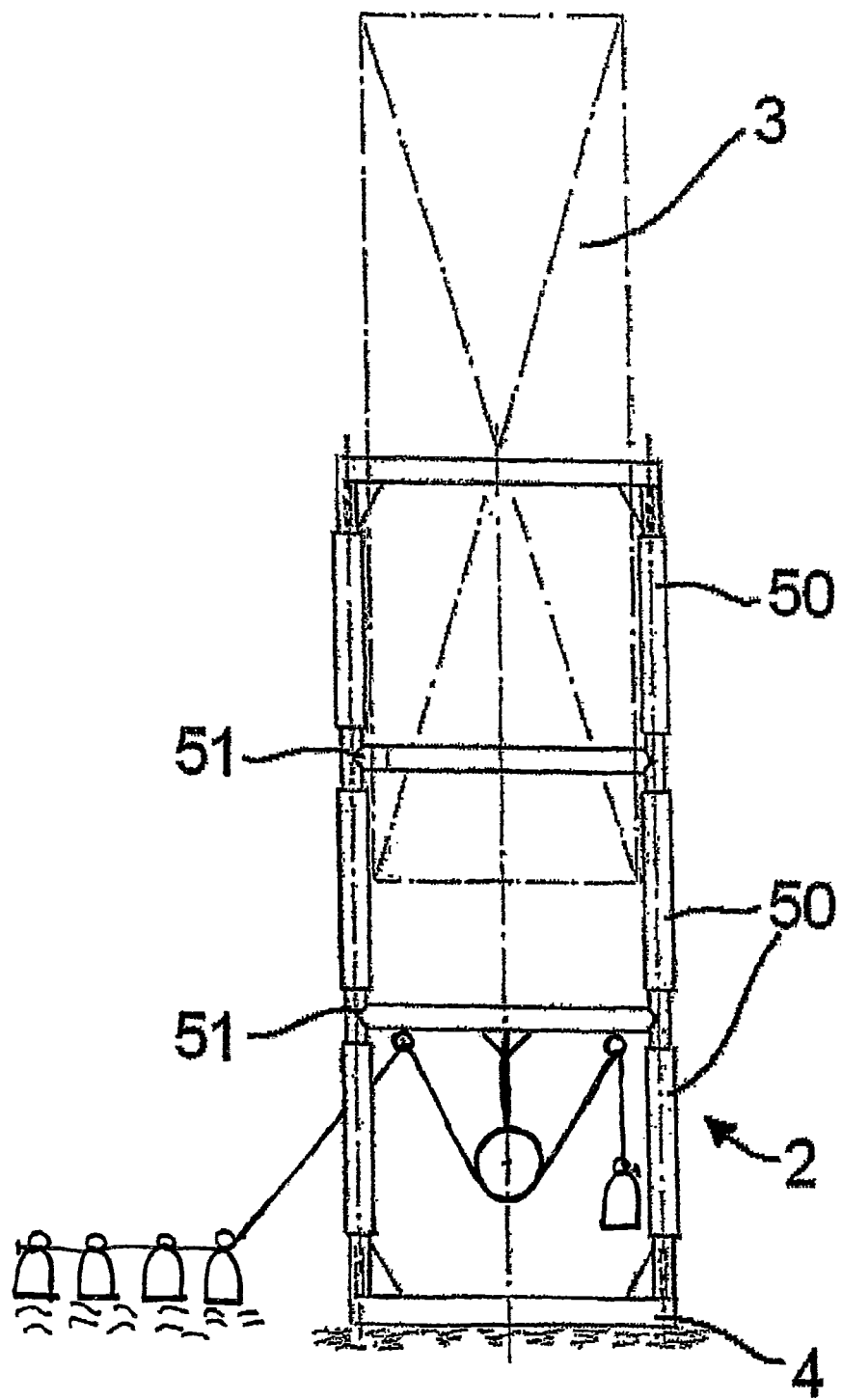
FIG. 5 represents a simplified front view of a hydroelectric device according to an alternative embodiment of the present invention.

FIG. 5 represents a simplified front view of a hydroelectric device according to an alternative embodiment of the present invention.

According to this alternative embodiment, the frame 1 is formed by tubes 50 force-fitted into intermediate connection elements 51, such that it is not necessary to weld them. Bolts may be provided if required to reinforce the strength of the structure.

The above description corresponds to preferred embodiments of the invention described for non-limitative purposes. In particular, the shapes represented and described for the different constituent elements of the hydroelectric device are not limitative.

Moreover, it can be envisaged, alternatively, to implement the device according to the invention, or an assembly of such devices as described above, according to a floating type fixing mode to the bottom of the aquatic environment.

Captive floats may be fixed in a sufficient number and volume in the lowest part of the frame, said part needing to be located, due to the level thereof obtained by means of varied filling of the tanks by means of an electropump, outside the current circulation zone and therefore below same.

Naturally, in this case, it is possible to envisage forming the frame of one part rather than two sliding portions. It is even possible, for an assembly of devices, to envisage that the various devices coupled together comprise a single frame, which makes it possible to reduce the number of uprights required for the assembly thereof and therefore lighten same with respect to the frames of the first embodiment wherein a significant weight of the device was advantageous, which is no longer the case when the devices are floating. Similarly, those skilled in the art will not encounter any particular difficulty modifying the number of tanks according to their requirements and, if required, envisage a number lower or higher than the number of rotating members.

The entire assembly may be held in position by a sufficient number of ballasted cables as follows:
  one heavily ballasted end of each of the cable would rest on the bottom of the aquatic environment;
  each cable would then run above one of the horizontal tubes of the lowest part of the assembly of structures and, firstly, in two rings holding same at either end of said tube and on an idle pulley positioned on said tube, between the two rings, (the cable could also run on two tubes);
  the other end of the cable could be suspended in the water, at a few meters in depth, below the assembly; it would be ballasted with a markedly lower weight that that holding the first end of the cable on the bottom.

In this way, the assembly of structures would oppose a resilient resistance to storms and would return to its position after they have passed.

Moreover, ballasts could consist of simple sacks of gravel closed with a loop enabling them to slide on the cable in succession.

Those skilled in the art will not encounter any particular difficulty providing the mechanical connection of the various constituent elements of the hydroelectric device according to the present invention. They may in particular envisage arranging nylon or Teflon (registered trademark) between the mobile parts to limit output losses and improve the service life of said parts, without going beyond the scope of the present invention.

Similarly, it is possible to envisage, as mentioned above, assembling the hydroelectric device on land before towing it with the empty tank(s) thereof to the installation site, for example at sea, irrespective of the subsequent fixing mode to the sea bed.

The invention claimed is:

1. A hydroelectric device, for the production of electricity in an aquatic environment of the type with currents, comprising:
    a frame supporting a rotating member having a plurality of bearing surfaces responsive to said current to generate a rotation of said rotating member;
    an electromechanical device to produce an electrical current from said rotation of said rotating member; and
    a device for adjusting the position of said rotating member with reference to the surface of the aquatic environment, wherein:
    said frame comprises an upper portion supporting said rotating member and a lower portion;
    said adjustment device comprises a tank having a variable opening positionable under the surface of the aquatic environment for modifying the water filling rate of said tank, said tank being borne by said upper portion of said frame; and
    said upper portion being connected to said lower portion so as to translate, so as to form a telescopic assembly a length of which varies as a function of said water filling rate of said tank.

2. The hydroelectric device of claim 1, further comprising a pumping device supplied with electricity by said electromechanical device, via an electrical connection, for pumping water from said tank.

3. The hydroelectric device of claim 1, wherein said electromechanical device comprises electrical connection means for transferring the electricity produced to an energy storage device or to a device for dispatching to land.

4. The hydroelectric device of claim 1 when it is arranged to be used in conjunction with ocean tidal currents, wherein said device for adjusting the position of said rotating member comprises an electronic circuit arranged so as to modify said position in a predefined manner as a function of the tidal characteristics.

5. An installation method of a hydroelectric installation comprising a plurality of hydroelectric devices according to claim 1, comprising steps consisting of:
    transporting said hydroelectric devices from land to the desired location for the installation thereof in an aquatic environment,
    establishing a mechanical connection of said hydroelectric devices with the bottom of the aquatic environment,
    wherein the transport step is performed with said hydroelectric devices having their respective tanks being empty, said devices being moved on the surface of the aquatic environment.

6. The hydroelectric device of claim 1, wherein said frame also comprises fixing means arranged to enable the fixing thereof to a bottom of the aquatic environment.

7. The hydroelectric device of claim 6, wherein said fixing means comprise a pulley arranged to cooperate with a cable.

8. The hydroelectric device of claim 7, wherein said cable has a first end fixed to the bottom of the aquatic environment and a second free end bearing a ballast.

9. The hydroelectric device of claim 8, wherein said frame comprises a cable passage defining a stop for said ballast.

10. The hydroelectric device of claim 1, wherein said upper portion is arranged so as to have one end continuously located at a level higher than that of said surface of the aquatic environment.

11. The hydroelectric device of claim 10, wherein said electromechanical device is arranged on said upper portion of said frame.

12. The hydroelectric device of claim 1, wherein said rotating member has a rotation shaft arranged in a substantially perpendicular direction to the direction of movement of the currents.

13. The hydroelectric device of claim 12, wherein said rotating member is a bladed wheel.

14. The hydroelectric device of claim 12, further comprising a protective cover of said rotating member at least arranged on a side of a top with respect thereto.

15. The hydroelectric device of claim 12, further comprising a protective screen of said rotating member at least arranged on a side of a bottom with respect thereto.

16. The hydroelectric device of claim 1, wherein said rotating member comprises a rotation shaft connected to said frame by means of at least one bearing, the hydroelectric device also comprising mechanical connection means to connect said shaft to at least one shaft of a rotating member of an identical hydroelectric device.

17. The hydroelectric device of claim 16, wherein said mechanical connection means comprise a differential.

18. The hydroelectric device of claim 16, wherein said mechanical connection means comprise a universal joint.

19. An assembly of hydroelectric devices according to claim 16, comprising at least two hydroelectric devices wherein the lower portions are connected rigidly to each other and wherein each comprises a shaft coupled mechanically with at least one adjacent shaft.

* * * * *